United States Patent
Sidie

(10) Patent No.: US 6,170,056 B1
(45) Date of Patent: Jan. 2, 2001

(54) METHOD AND APPARATUS FOR IDENTIFYING A COMPUTER THROUGH BIOS SCANNING

(75) Inventor: Robert J. Sidie, Lebanon, NJ (US)

(73) Assignee: AT&T Corp., New York, NY (US)

( * ) Notice: Under 35 U.S.C. 154(b), the term of this patent shall be extended for 0 days.

(21) Appl. No.: 09/150,535

(22) Filed: Sep. 9, 1998

(51) Int. Cl.[7] .................................................. G06F 9/445
(52) U.S. Cl. .............................. 713/2; 712/32; 710/220
(58) Field of Search ................................ 713/2; 712/32; 710/220

(56) References Cited

U.S. PATENT DOCUMENTS

| | | |
|---|---|---|
| 4,025,906 | 5/1977 | Riikonen . |
| 5,142,626 | 8/1992 | Arnold et al. . |
| 5,305,437 | 4/1994 | Fritze et al. . |
| 5,319,770 | 6/1994 | Lehman . |
| 5,475,839 | 12/1995 | Watson et al. . |
| 5,530,887 * | 6/1996 | Harper et al. ........................ 710/104 |
| 5,632,027 * | 5/1997 | Martin et al. ........................ 711/170 |
| 5,675,825 | 10/1997 | Dreyer et al. . |
| 5,696,701 | 12/1997 | Burgess et al. . |
| 5,708,848 | 1/1998 | Sangveraphunsiri et al. . |
| 5,794,032 * | 8/1998 | Leyda ....................................... 713/2 |
| 5,794,066 * | 8/1998 | Dreyer et al. ......................... 712/32 |
| 5,999,989 * | 12/1999 | Patel ....................................... 710/1 |

OTHER PUBLICATIONS

Hansen, A., "Detecting Display Systems", PC Tech Journal, vol. 5, No. 7, Jul. 1987, pp. 174–182.
Stillman, R.A., "Testing For IBM PC Compatibility", BYTE Guide to the IBM PC, vol. 9, No. 9, Fall 1984, pp. 256–262.

* cited by examiner

Primary Examiner—Albert De Cady
Assistant Examiner—Nguyen Xuan Nguyen

(57) ABSTRACT

A method and device for identifying the manufacturer make and model type of a computer involves scanning the BIOS area of memory for personal computer (PC) configuration data. This scanned data is then used to generate a character-based computer identification string that is unique to a certain type of computer. This string is then compared to a set of known strings to determine the manufacturer make and model type of the polled computer. From scanning a number of personal computers and through user feedback, the process may build upon its knowledge base of personal computers.

19 Claims, 5 Drawing Sheets

THE BIOS PC CONFIGURATION TABLE HAS THE FOLLOWING FORMAT:

| ADDRESS | OFFSET | SIZE | DESCRIPTION | EXAMPLES |
|---|---|---|---|---|
| F000:E6F5 | 00h | WORD | LENGTH OF CONFIGURATION TABLE | |
| | 02h | BYTE | MODEL BYTE | FCh, FAh, F8h |
| | 03h | BYTE | SUBMODEL BYTE | 01h, 4Ch, 50h |
| | 04h | BYTE | BIOS REVISION NUMBER | 00h, 01h, 02h |
| | 05h | BYTE | FEATURE CODE BYTE | 70h, F6, 42h |
| | 06h | WORD | RESERVED WORD 1 | 0000h, 5041h |
| | 08h | WORD | RESERVED WORD 2 | 0000h, 3E3Eh |
| | | | | |
| F000:FFF5 | 00h | | BIOS DATE STRING | 09/02/86, 12/26*89 |

ALL ADDRESS AND OFFSETS ARE SPECIFIED IN HEXADECIMAL NOTATION.
ADDRESSES ARE SPECIFIED IN SEGMENT:OFFSET NOTATION.

FIG. 5

SAMPLE PC IDENTIFICATION STRINGS AND THEIR ASSOCIATED MANUFACTURERS:

| # | CHARACTER STRING | MANUFACTURER MAKE/MODEL |
|---|---|---|
| 1 | fc-01-00-70-0000-0800-01/15/88 | GATEWAY 2000 4DX2-66V TOWER |
| 2 | fc-01-00-70-0000-0000-08/07/89 | AT&T WGS 25 |
| 3 | f8-00-00-f6-0000-0000-04/13/92 | NCR 3300 (MICRO CHANNEL) |
| 4 | fc-01-00-74-0000-0000-11/07/95 | TOSHIBA TECRA 700 CT |
| 5 | 00-3c-3c-42-5041-3e3e-05/14/96 | COMPAQ LTE 5150 |
| 6 | fc-01-00-74-0000-0000-06/18/96 | COMPAQ DESKPRO 4000 |
| 7 | fc-01-00-74-0000-0000-09/05/96 | TOSHIBA TECRA 730 CDT |
| 8 | fc-01-00-74-0000-0000-09/16/96 | COMPAQ DESKPRO 4000 |

FIG. 6

EXAMPLE 'C' LANGUAGE PROGRAM FOR READING
BIOS PC CONFIGURATION DATA AND CREATING A
HYPHEN-DELIMITED CHARACTER IDENTIFICATION STRING

FIG. 7

```c
typedef struct
{
    unsigned int       len;
    unsigned char      model;
    unsigned char      submodel;
    unsigned char      revision;
    unsigned char      features;
    unsigned int       reserv1;
    unsigned int       reserv2;
}
ROMBIOS;

//   declare the necessary variables
    char            *bios-date-ptr;
    ROMBIOS         *bp;

//   create a pointer to ROM BIOS in memory
    _FP_SEG(bp) = 0xF000;    //   set memory segment of ROMBIOS
    _FP_OFF(bp) = 0xE6F5;    //   set offset in segment for ROMBIOS //   create a pointer to the BIOS date string
    _FP_SEG(bios-date-ptr) = 0xF000;    //   set memory segment of ROMBIOS
    _FP_OFF(bios-date-ptr) = 0xFFF5;    //   set offset in segment for ROMBIOS //   create a BIOS parameter string
//   (string the various parameters together as hexadecimal values, separated by '-'s)
//   this includes the BIOS date string
    printf( "%2.2x-%2.2x-%2.2x-%2.2x-%4.4x-%4.4x-%8.8s",
        bp->model,
        bp->submodel,
        bp->revision,
        bp->features,
        bp->reserv1,
        bp->reserv2,
        bios-date-ptr );

//   end
```

METHOD AND APPARATUS FOR IDENTIFYING A COMPUTER THROUGH BIOS SCANNING

FIELD OF THE INVENTION

This invention relates to an automated, non-intrusive process for identifying the exact make and model type of a computer.

BACKGROUND OF THE INVENTION

With the ever increasing versatility and interchangeability of personal computers, as evidenced by the recent emergence of the plug-and-play standard for peripherals, the actual physical contents of a personal computer (PC) have become increasingly harder to determine. A cursory glance at the outside of a computer will tell you little about the machine's actual contents in this age of microprocessor replacement, upgrades, and accelerator chips. However, as network computing has become the norm in the business world, knowledge of the contents of each computer on the network has become more important than ever to make sure that an upgrade in network software or hardware will not be incompatible or inoperable on any of the machines attached to that network.

A solution to the problem of inventorying computers on a network has become even more imperative as the new millennium approaches. Many software and hardware programs will experience problems because their underlying program code is based on a two digit representation of the year. Hence, as the year goes from 1999 (represented in the computer as '99') to 2000 (represented in the computer as '00'), much computer hardware and associated software applications will give errant results because they calculate the year '00' to correspond to 1900: 99 years before 1999. Ultimately, some machines may fail entirely. Because of the vast array of computers attached to most networks, all computers must be properly identified and cataloged to limit the amount and severity of problems that occur as the millennium changes. Any step taken now to avoid a catastrophe in the future is a step well taken.

Obviously, the first step in correcting a potentially widespread network problem is to identify the computers that reside on that network. In the past, machines were often inventoried by physical inspection. This process entails forcing the user to log off of their computer for a length of time, physically opening the PC, and identifying the computer by reading the labels on the BIOS, microprocessor, and other added chips and circuitry. Such a process is disruptive and carries with it the possibility that the physical handling of the computer chassis and internal parts will cause an internal part to fail because of, for example, static electricity.

Some software programs have tried to identify personal computer components in a less intrusive way. These programs can perform some rudimentary identification tasks, such as polling the microprocessor for manufacturer information, but these methods fall well short of the complete personal computer inventory that is necessary and prudent before a major network upgrade or in contemplation of fixing any possible year 2000 problems. As software and hardware become more complex, pushing the limits of a computer's capability, some programs or peripherals may distinguish between two computers that have the same make and model number, but were manufactured several months apart and, hence, have different BIOS versions. For example, a second version of a BIOS may be written to facilitate using a large hard drive of multiple gigabyte capacity. Because some components can distinguish between such subtle differences in PC's, the computers on a network must be individually identified at the BIOS level.

One particular prior art system is a graphical system descriptor method and system in U.S. Pat. 5,305,437 to Fritze et al. Fritze et al. disclose a method and system for a graphical hardware description and testing interface for use in conjunction with a data system. More specifically, the Fritze method contains a step where the data processing system is polled to determine the configuration—layout of slots, subslots, components, and subcomponents. The process begins with a call to the BIOS to determine modelisubmodel and the identity of the system. While Fritze et al. may scan the BIOS for basic computer information, Fritze et al. do not contemplate the intensive BIOS scanning of the present invention that is but one element in the larger automatic computer inventorying process disclosed here.

The Basic Input/Output System (BIOS) of a computer is the lowest layer of system software between the processor and the user. The BIOS is a collection of routines that control I/O devices and provide basic computer system services. In personal computers, the BIOS is usually resident in a Read Only Memory (ROM) within the computer to alleviate the need to load it from an external source every time the computer is booted.

The BIOS services are accessed through software interrupts that are generally called using assembly language. Many of the software interrupts are standard in the computer industry, which enables portability of programs that use these BIOS software interrupts. Also, many common programming languages, such as the 'C' language, contain preprogrammed functions that can be used to access the BIOS memory area.

One part of the BIOS contains a table of hexadecimal entries that describe the type of computer and BIOS revision date. The manufacturer uses these entries in tandem to uniquely identify a computer. These fields include the computer's model, submodel, BIOS revision number, features, reserved words, and a string representing the BIOS revision date. Taken as a whole, these entries can distinguish between not only different computer manufacturers and model numbers, but between two computers of the exact same manufacturer and model number that contain different versions of BIOS. Although a small change in hardware, a newer BIOS version may correct a problem that causes certain low level software or hardware (large capacity disk drive) to fail, and hence, only a computer containing the newer BIOS version can be used with that particular piece of software or hardware.

Because of the complexity of recent software innovations and the extent to which computers are pushed by the new software, such subtle changes in the BIOS must be identified before deciding on the proper choice of software to be used on a machine, especially in a networked environment. For years, some programs have scanned small areas of the BIOS to get some computer identification information, but there remains a need in the art to scan the complete BIOS identification area and develop an automated process for inventorying a computer to a greater extent.

Towards this end, there is a need in the art for a method to perform BIOS scanning and identification code comparison in an efficient, non-intrusive way that can be used by single users and large companies to inventory their computers and prepare for software upgrades and impending year 2000 issues.

SUMMARY OF THE INVENTION

It is therefore an object of the present invention to provide a non-intrusive process for inventorying a personal computer's exact model type. More specifically, it is an object of the present invention to provide a process for completely inventorying a personal computer by a non-intrusive software application that can scan the computer's BIOS and generate an identification string that can be compared to a table of known identification strings to determine, down to the BIOS revision level, the exact type of personal computer that is being queried.

Towards that end, the exact model type of a personal computer can be established by scanning the BIOS of the computer and copying selected segments thereof. These scanned segments can then be concatenated to form a text string that identifies the computer. Finally, this identification string can be compared to a table of previously identified strings to establish the exact make and model type of a personal computer.

This method is fast, as the method is largely software dependent with no physical tearing apart of the inventoried PC, and this method is much less likely to cause any physical fault in the personal computer because no rough manipulation of the chassis is necessary. Also, this method is more likely to obtain the correct and true identification results because a physical examination of the computer can produce incorrect results because of mislabeled components or a mistake of identification. The BIOS scanning method of the present invention is more complete than any of the previous computer identification methods as it scans the low level BIOS of the computer to find its information. Finally, the present method has complete adaptability. As new, unknown identification strings are obtained from the BIOS, a quick physical inspection of the unknown computer will allow its identification and subsequent entry into the identification table so, from that point on, the previously unknown identification string will be known.

In one aspect of the present invention, the scanning program is integrated into the network login process of users of a computer network. Here, as part of the login process, the computer calls the BIOS scanning program to be executed from the login server. The program uses low level software interrupts to poll the BIOS area of computer memory to obtain the computer identification information. In response to the software interrupt requests, the computer returns hexadecimal values that correspond in our preferred embodiment to a predetermined string including the model, submodel, revision number, features, reserved word 1, reserved word 2, and the BIOS date string. The software program makes a character string that consists of these scanned values separated by hyphens. The string is assembled, for example, as model(hex)-submodel(hex)-revisionnumber(hex)-features(hex)-reservedword 1(hex)-reservedword2(hex)-BIOSdatestring. Another order may also be appropriate depending on the application.

This character string identifies the exact computer manufacturer and model type that is being scanned. The string is then passed back to the server to be used as an index to a table that identifies a one-to-one correlation between these BIOS identification strings and an ultimate computer manufacturer and model type. The table reads the input identification string and compares this string to the first known identification string in the table. If the strings match, the corresponding known computer manufacturer and model type are the output of the program, to be used by other programs or means for inventorying the computers of the network.

If the strings do not match, the scanned data string is subsequently compared to the next known identification string in the table. Again, if a match is found, the correctly identified manufacturer name and model number are output. This process continues until either a match is found or the table is exhausted. If no match is found, the unknown, or unresolved, identification string is inserted as the last entry of the table.

Once an unresolved string is entered in the table, the computer that was scanned to produce the unresolved string should be identified by some means. Then, the appropriate corresponding manufacturer name and model type should be input into the table. Now, the unresolved string has been resolved. This identification could be performed by having the data storage computer automatically dial the telephone number associated with the user of the scanned computer or by physical inspection of the machine by the system administrator. In any event, the unresolved, scanned BIOS identification string has now become a known, or resolved, entry in the table for future use.

This expandability is essential to keep pace with the rapidly changing world of computers where upgrades occur often. Because any newly resolved BIOS identification screen is added to the computer manufacturer table or data base, a new BIOS version only needs to be physically identified once. Once a new BIOS identification string has been resolved, all subsequent new users of the same BIOS will be identified by the data table or data base. This automation saves employee time and money that previously would have been spent physically identifying each new computer that entered a specific work environment.

These and other objects and features of the present invention will be apparent upon consideration of the following detailed description of preferred embodiments thereof, presented in connection with the following drawings in which like reference numerals identify like elements throughout.

BRIEF DESCRIPTION OF THE DRAWINGS

FIG. 5 is a table of the address location of the PC configuration data segments of the BIOS memory area. A brief description of each segment and examples are given for clarity.

FIG. 6 shows examples of concatenated data strings assembled from the results of the BIOS scanning procedure and software manipulation of these scanned values. This figure also shows the computer manufacturer and model type that correspond to each identification string.

FIG. 7 is an example of a software program written in the 'C' programming language that polls the BIOS memory to obtain the hexadecimal PC identification information and generates a hyphen-delimited computer identification character string to be used to determine the manufacturer and model type of the polled computer.

DETAILED DESCRIPTION OF THE PREFERRED EMBODIMENT

Figure 1:
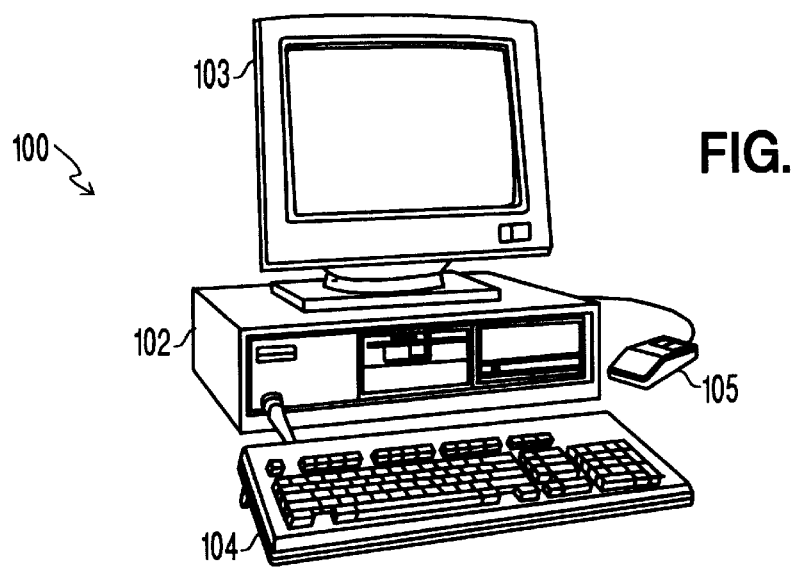
FIG. 1 shows a representation of a typical personal computer.

Personal computers have become almost ubiquitous for carrying on business these days. The present detailed description will discuss the application of the present invention to a personal computer, but the principles may be applied equally to any networked computer. FIG. 1 shows a picture of a typical personal computer 100. Here, the CPU, memory, and drives are housed in a chassis 102, and the computer displays typically graphical information to the user by way of a monitor 103. The user can enter commands, run programs, and generally interact with the computer by way of a keyboard 104 and/or a mouse 105. Although not shown, a user may also enter commands verbally through a microphone or the like as is known in the art. While the present invention will be described with specific reference to a personal computer, the present invention may be applied in any intelligent device or processor hardware configuration which may communicate with another such device over a network. Such digital devices may include and should not be limited to include only the following devices: mainframe computers, intelligent telephones, digital cable television terminals, satellite terminals, Internet terminals, wireless pagers and other digital devices having basic input output system and memory.

Figure 2:
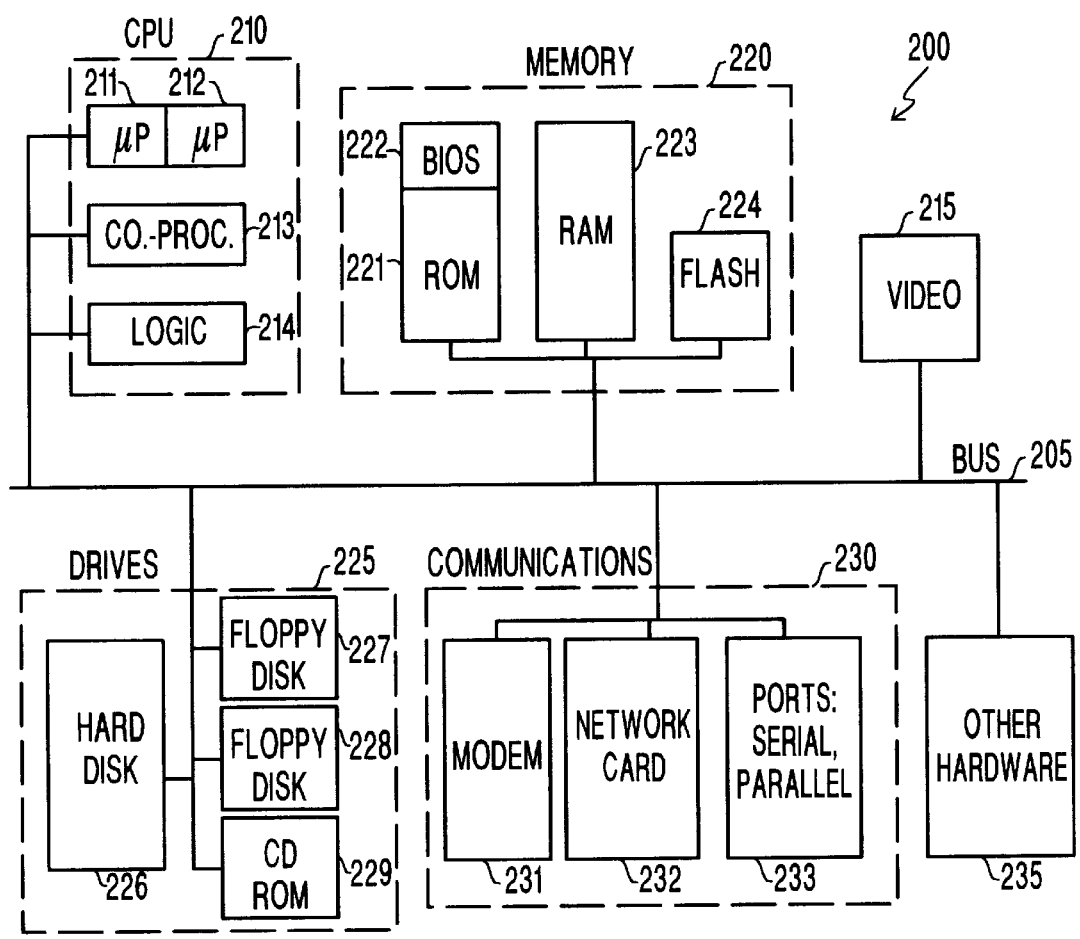
FIG. 2 shows the basic internal structure of a typical personal computer.

FIG. 2 shows a basic outline of the internal structure 200 of a typical personal computer. Here all of the internal and external parts of the computer are electronically connected to each other by way of a bus 205. The Central Processing Unit (CPU) 210 contains a microprocessor 211, or multiple microprocessors 211, 212 working in parallel, along with one or more math coprocessors 213 that perform the computations necessary for the computer to function. There is other logic 214 in the CPU that performs the control and computation operations necessary to move and manipulate information throughout the personal computer system.

Along with the CPU, the computer contains a display interface 215. This includes both the hardware necessary to physically interconnect a video monitor 103 to the computer and the software drivers necessary to allow the CPU and other computer parts to communicate with the monitor 103. The display area of the PC may contain its own memory to lessen the amount of time it takes to manipulate video data.

The program information and instructions are stored in memory 220. Here, the memory may contain Read Only Memory (ROM) 221 to which information cannot be rewritten after the memory is initially programmed. This type of memory is good for holding information that the computer uses early in its boot cycle, before any user interaction. Part of this ROM may be the BIOS memory 222 which contains the necessary programs to interface with the microprocessor 211 and other system components at a very low level. The BIOS contains identification information about different system components, and the BIOS has the ability to initialize the other parts of the computer to get them ready to be used by the person operating the computer. The memory may also contain a Random Access Memory (RAM) 223 to which information is written and rewritten depending upon the particular function that the computer is performing. This area is used by programs when they are operating but could also store the BIOS if programmed that way. Some other types of memory, including flash memory 224, can also be used to store the BIOS information. In this case the ROM might be a flash BIOS, that allows the BIOS to be rewritten, or flashed, by the use of a certain software program.

The actual programs and other information that are too large to be stored in memory 220 when not being used by the computer can be stored in one or more disk drives 225 that can be attached internally or externally to the bus 205 of the computer. Normally, one or more floppy disk drives 227, 228 are attached to the computer's bus 205. These drives allow portable storage of program information and can be a small 3½" or 5¼" floppy disk, a large capacity removable memory element drive, or some other type of removable storage. Also, a larger capacity removable disk storage may be a Compact Disc Read Only Memory (CDROM) 229 or some type of rewriteable large capacity disk. Finally, a hard disk 226 can hold large amounts of information that can be accessed quickly by the other elements of the computer.

Also, computer 200 may contain some type of communication hardware and software 230 for passing information to and from other computers and digital hardware. For instance, a modem 231 may be connected either externally or internally to the computer for passing information. This modem may be a common modem that transfers data over common phone lines, or it may be connected to an optical fiber, a wireless medium, or some other type of communications channel.

The communications could also take place by way of a network card 232 connected to a wired or wireless network of other terminals, servers, and digital hardware. Here, the card 232 may allow communication to an Etherlink network or any other packetized or nonpacketized network through an almost endless variety of transmission media. Finally, the communications could take place by way of a simple serial or parallel port 233 that is directly connected to one or more other computers or digital hardware. The communications can take place in any way commonly known in the art. The present method is versatile as it can be used on one single machine or along a network of computers and other devices regardless of what transmission path is present.

Finally, the internal personal computer structure shown in FIG. 2 contains other hardware 235. This block represents the keyboard controller, mouse controller, and all other control and data manipulation elements present in the typical personal computer that are not especially relevant to the present device and method. A wide variety of other hardware and software elements may be present here and do not impact the invention in any significant way.

Figure 3:
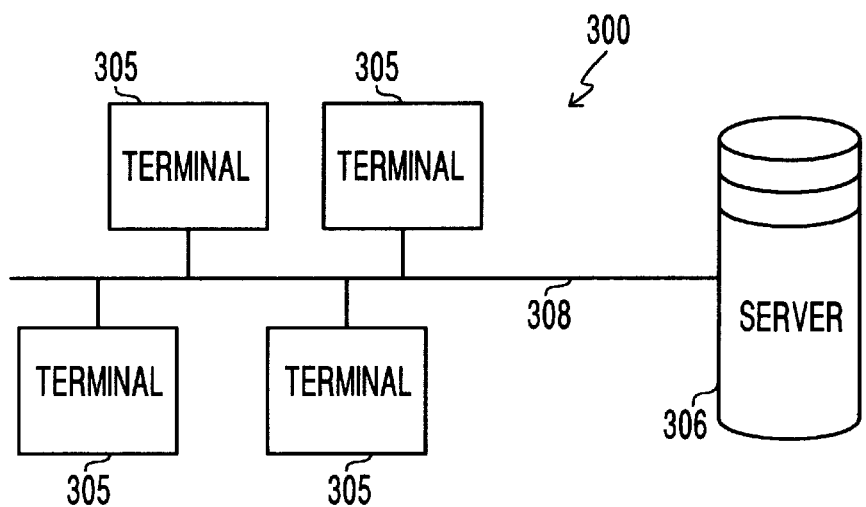
FIG. 3 shows a representation of a typical multi-user network where the user terminals are connected to a server containing login data and network administration information.

On its own, the above-described computer is a very powerful tool to be used by a person for cataloging and referencing large amounts of data, performing rudimentary and repetitive tasks, and for organizing information in many useful ways. However, additional advantages arise from linking multiple computers together, so that many users can share the processing power, data storage space, and programs associated with one central computer or server. FIG. 3 shows a representation of just such a network 300 where many computers or terminals 305 are connected to a server 306 by way of a wired or wireless local area network (LAN) transmission medium 308.

In the example network 300 of FIG. 3, the users can share the programs and storage space of the central server 306, while maintaining privacy of documents on their own machines 305. This interaction of many computers requires complex software that can manage the information being used by multiple users at once. Any such software existing on the server 306 to be run on the user computers 305 must be compatible with every computer on the network 300. A machine that is too old or slow might not be able to handle the newer, faster software and may end up bringing down the network server 306 when the older computer attempts to run the new software.

Practically speaking, it is not efficient to test each new piece of software on every machine 305 connected to the network 300 each time software is bought or upgraded. Hence, the types of computers 305 that exist on a network 300 must be identified and cataloged to make sure that any new software is operable on that machine 305. Keeping an accurate inventory of the computers 305 on a network 300 is also just good accounting practice as every business should know what property the company owns. Especially with small business, the accounting depreciation practices need to keep a close accounting of what computers are owned by the company. Finally, keeping an accurate inventory of the computers 305 that log into a network 300 can be used as part of a process to warn the network administrators when an 'outsider' has logged in. In today's world of industrial espionage and computer viruses, such security measures are important.

Figure 4:
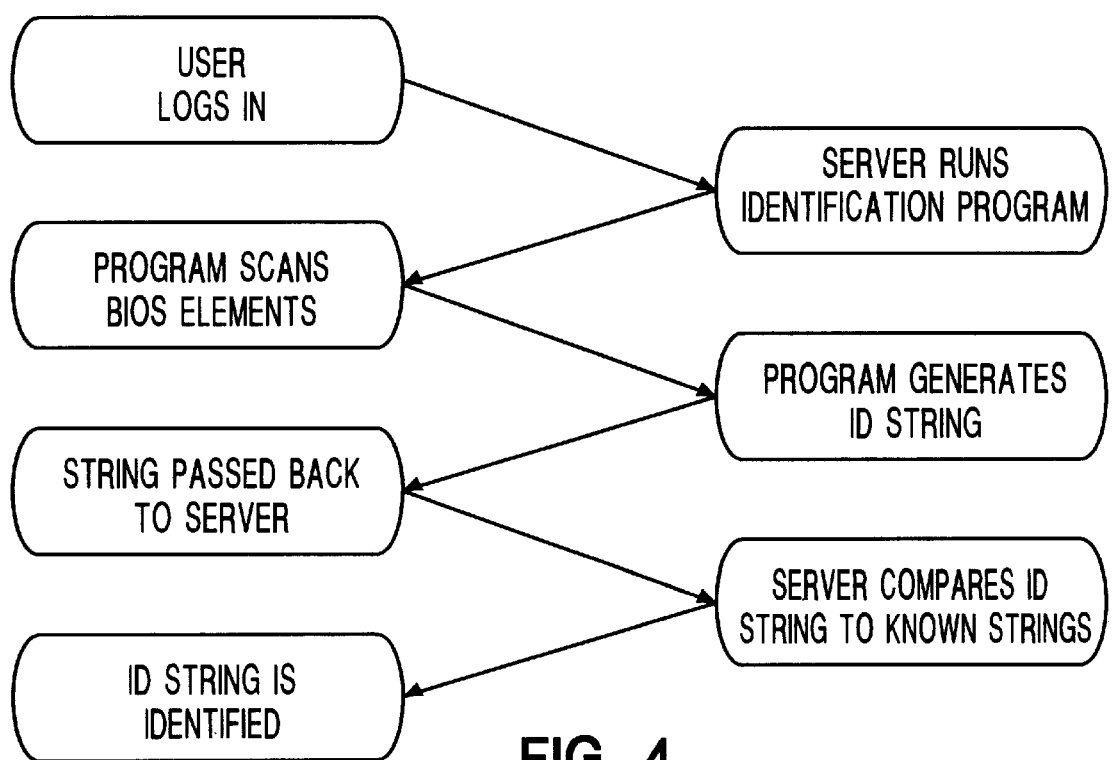
FIG. 4 shows the general flow chart for the method associated with the preferred embodiment of the present invention.

One embodiment of the present invention, as shown in FIG. 4, comprises a method for scanning the Basic Input/Output System (BIOS) memory of a computer during the computer's network login process to determine the machine's manufacturer and model type. This information is embedded in the BIOS of a computer and can be interpreted using the method of the present invention.

When a user turns on their networked personal computer 305, the computer communicates with the central computer or server 306 through a network card 232 or other means to set up a communications channel between the user and the other machines on the network 300. This process is known as "logging on" to the network 300. According to one aspect of the present invention, one of the communications made to the server 306 executes a software program based on the present method that scans the user computer's BIOS for identification information.

First, the program uses low level software interrupts to scan the BIOS identification system. FIG. 5 shows the address locations in the BIOS where the identification elements exist. The BIOS PC configuration data begins at memory address F000:E6FF, where the address is given in hexadecimal Segment:Offset notation as is commonly known in the art. The first word, for example, containing two bytes, of information at this address is a word representing the length of the configuration table. This element can be ignored in the preferred embodiment of the present invention.

At a 02h offset from the start of the configuration table, there is a one byte model identification element followed by a one byte submodel element. These two bytes are hexadecimal codes used by manufacturers to distinguish between the BIOS used by different computers. FIG. 5 gives examples of values used by some manufacturers.

The next byte of information in the memory contains the BIOS revision number. This hexadecimal byte is usually set to 00h for the initial release of a particular BIOS. Then, as subsequent versions of the specific BIOS are released, this number is incremented by one for each new BIOS version release.

The next byte of information after the BIOS revision number is the feature code byte. This element contains hexadecimally coded information of the various computer features that are supported by the given BIOS. For each feature that is supported, a certain binary bit is asserted to '1' with 8 bits of information, or features, stored in the one byte element. The feature code bits represent the features found in the Table 1 below.

TABLE 1

| Bit # | Feature Description |
|-------|---------------------|
| 7 | DMA channel 3 used by hard disk BIOS |
| 6 | Second interrupt controller chip installed |
| 5 | Real-time clock installed |
| 4 | Keyboard intercept called by Int. 09h |
| 3 | Wait for external event supported |
| 2 | Extended BIOS data area allocated |
| 1 | PC bus is Micro Channel |
| 0 | Reserved |

So, for example, a BIOS supporting the Micro Channel PC bus might have a BIOS feature code byte of 02h, whereby bit 1 is asserted.

After the feature code byte, there are two consecutive word-long elements that are reserved for the BIOS manufacturer. These two words, or four bytes, of information can be used by the BIOS manufacturer in any way they see fit. It is to be observed that manufacturers can use these words to distinguish among similar BIOS versions.

Finally, the BIOS date string is scanned starting at memory address F000:FFF5. Here, the BIOS date is encoded using ASCII representations of the date. Often, the date is rendered in mm/dd/yy format. Sometimes, however, a manufacturer will change this format and replace one or more of the date string characters with a substitute character or characters. FIG. 5, line 8 shows an example where the date is represented as Dec. 26, 1989. This asterisk character substitution might be used to delineate between two similar BIOS versions that were created on or near the same day.

As shown in the FIG. 4 flow chart, after scanning the BIOS PC configuration elements, the next step in one preferred embodiment of the present invention is to generate a character string based on the scanned identification elements. One way to create this string is to simply concatenate the scanned hexadecimal values together, delimiting each element with a positioning character such as a hyphen or dash. FIG. 6 shows examples of character strings that are generated when such a hyphen-delimited approach is taken in forming these character identification strings. FIG. 6 also shows the computer manufacturer and model types that are associated with some example identification strings.

FIG. 7 shows one example of a program used to scan the BIOS data area and generate the hyphen-delimited character string described in the above method. Here, the program is written in the 'C' programming language format. Several pointers are generated corresponding to the memory offsets of the identification elements, and these pointers are used to scan the BIOS PC configuration elements of the memory. Then, these scanned values are assembled into a character string at the end of the 'C' program. FIG. 7 merely shows one simple embodiment of the preferred method for illustrative purposes, but this method is not limited to such a program. The methods of FIG. 7 can be used by those skilled in the art in almost countless ways that are taught by this example.

According to the FIG. 4 embodiment, this identification string is then passed back to the central computer or server 306 that performs the inventorying, system administration, or bookkeeping functions associated with the computer network 300. Here, there is a data table with two columns of information as suggested in FIG. 6. The first column contains a list of all resolved computer identification character strings as generated by the software program in the above description. The second column contains the manufacturer name and model type of the computer that corresponds to each respective resolved BIOS character string. Because the character strings are unique to a specific kind of computer, there is a one-to-one correspondence between the strings and the manufacturer/model labels.

Lines 6–8 of FIG. 6 show one feature of the present invention. Here, three very similar identification strings represent BIOS's actually used in two wholly different computers. Lines 6 and 8 show two different BIOS versions used with the Compaq Deskpro 4000. By distinguishing between these two 'versions' of the same computer make and model, a piece of software that is known to only operate correctly on one specific BIOS version can be replaced before a computing error or network failure occurs. Previous methods of visually identifying the maufacturer from outside the computer chassis cannot distinguish such subtleties, possibly causing preventable errors.

FIG. 6, lines 6–7 show how similar the BIOS identification strings in two different computers can be. Here, the great extent to which the preferred embodiment of the present method scans the BIOS identification areas of memory enables the distinguishing between a Compaq Deskpro 4000 and a Toshiba Tecra 730 CDT. The detection of these slight BIOS variances could prevent a major computer problem before the problem arises.

The next step in the FIG. 4 method is to compare the scanned character string to those in the table of known strings, as shown in FIG. 6, to determine what type of computer was scanned. Here, the string is compared, character-by-character to the first known BIOS identification string to see if they match. If they match, the program returns the name of the computer manufacturer and model number to the user of the program. This value can then be used in an almost limitless number of further applications. Some of these other applications include 1) adding this information to a large database of current computers, 2) using the computer manufacturer's name in an inventory reference to see how many computers were purchased from this company, or 3) any other database or accounting process that could be useful in managing company resources.

If the scanned BIOS string and the first known string do not match, then the unknown string is compared to the second known BIOS identification string in the data table. Again, the strings are compared character-by-character to determine if they match. If a match is found, the computer manufacturer and model type is output to the user, but if no match is found, the indexing to the table continues to the next known BIOS identification string. This comparison continues until either a match is found or all of the known BIOS identification strings are found to not match the scanned BIOS string.

If the scanned BIOS string does not match any of the known strings, the program enters the unknown PC identification string as the final entry in the list of known BIOS identification strings. Then, the program can alert the server that an unknown value has been found. For instance, the program might display a message on the server console that an administrator needs to find what computer this string was scanned from, or the program may automatically dial the user or system administrator's telephone number and ask for a response to this inquiry.

Ultimately, the unknown computer is identified and the computer manufacturer and model type are obtained by inspection of the machine. These values are then entered into the data table on the server corresponding to the previously unknown data string. Hence, from that point on, the previously unknown BIOS string is now known. The next similar computer to log onto the network will be identifiable.

It is to be understood that the disclosed embodiments of the device are merely illustrative of the principles of the present invention which could be implemented by other types of structures which would be readily apparent to those skilled in the art. In addition, although the BIOS scanning method and device were described in accordance with use as part of the login process on a multiple-user computer network, this method and device can be used to correctly identify one solitary computer or identify the multiple users of a network in some way other than as part of the login process. Also, the output of the identification program may be used to automatically preselect software installation choices to decrease the amount of time it takes to perform a network-wide software upgrade.

The table of BIOS identification strings and computer manufacturers and model types could exist on the server of a network, on a disk on one solitary machine, as part of an Internet download service, or by any other means able to pass this information to the polled computer. Also, the present invention has been described with reference to scanning a personal computer, but the method and device can be expanded to include any digital hardware containing some form of memory including at least some identification information that can be compared to a set of known identification values. Accordingly, the scope of the present invention is to be determined in accordance with the appended claims.

What is claimed is:

1. A method for identifying the make and model type of a digital device including Basic Input Output System (BIOS) memory, said method comprising the steps of:

scanning specific areas of a device memory for configuration information including a model element, a submodel element, and at least one of a BIOS revision number element, a features element, a first reserved word element, a second reserved word element, and a BIOS date string element;

assembling said scanned device configuration information into a BIOS identification string of computer-recognizable bits;

comparing said BIOS identification string to a known identification string; and determining the make and model type of said digital device.

2. The method of claim 1 wherein said known identification string is an entry in a cross-reference table that provides a one-to-one correspondence between known BIOS identification strings and the device make and model type associated with said known string.

3. The method of claim 1 wherein said scanned device configuration information is scanned from the digital device by executing a software program that scans the area of the BIOS memory containing the device configuration information.

4. The method of claim 1 wherein said digital device comprises a personal computer.

5. An automated method for identifying the manufacturer make and model type of a digital device including BIOS memory, said method comprising the steps of:

executing a software program that scans the BIOS memory;

scanning the device configuration information elements of the device BIOS memory including a model element, a submodel element, and at least one of a BIOS revision number element, a features element, a first reserved word element, a second reserved word element, and a BIOS date string element;

assembling said scanned device configuration information into a BIOS identification string of ASCII characters;

using said BIOS identification string as an index in a table that can identify the device manufacturers make and model type; and determining the device manufacturers make and model type by translating the information contained in said table.

6. The method of claim 5 further comprising the steps of:

maintaining the information of said table by a method comprising:

entering unknown BIOS identification strings into said table;

receiving data gathered from a physical examination of the device that generated said unknown BIOS information string to determine said device's make and model type;

inputting said physically ascertained device make and model type into said table to correspond in a one-to-one relation with said previously unknown BIOS identification string; and enabling said unknown BIOS identification string to be known to future users of said table.

7. The method of claim 5 wherein the translation from BIOS identification string to device make and model type comprises the steps of:

comparing said unknown BIOS information string with the first identified BIOS information string entry in said table;

outputting the device make and model type corresponding to said first identified BIOS information string if said unknown BIOS information string exactly matches said first identified BIOS information string;

comparing said unknown BIOS information string with the next identified BIOS information string entry in said table if said unknown BIOS information string does not exactly match said first identified BIOS information string;

continuing to compare the unknown BIOS information string to successive identified BIOS information strings in said table until an exact match is found and the corresponding device make and model type are returned to the user of the program; and alerting the user that the scanned BIOS information string is unknown if the unknown BIOS information string does not exactly match any of the identified BIOS information strings.

8. The method of claim 5 wherein said digital device comprises a personal computer.

9. A data processing system for identifying the manufacturer make and model type of an associated data processing system, said system comprising:

Basic Input Output Services (BIOS) memory including at least one of a BIOS revision number element, a features element, a first reserved word element, a second reserved word element, and a BIOS date string element;

memory reading means for scanning said BIOS memory elements including at least one of a BIOS revision number element, a features element, a first reserved word element, a second reserved word element, and a BIOS date string element;

character string generation means whereby the said at least one scanned system configuration information element can be included in the generated character string;

data storage means whereby a table correlating said generated character strings to a system manufacturer make and model number can be stored and updated; and data comparing means whereby said scanned character string can be compared to said stored data table to determine the system manufacturer make and model type associated with said scanned character string.

10. A method for identifying a computer system configuration including a Basic Input Output System (BIOS) memory, said method comprising the steps of:

scanning specific areas of said BIOS memory for configuration information including BIOS version information having at least one of a BIOS revision number element, a features element, a first reserved word element, a second reserved word element, and a BIOS date string element;

assembling said scanned device configuration information including BIOS version information into a BIOS identification string of computer-recognizable bits.

11. The method of claim 10, further comprising the steps of:

determining if a software package is compatible with a BIOS version identified with said BIOS version information; and using said software package on said computer system if said software package is compatible with a BIOS version.

12. The method of claim 10 wherein said known identification string is an entry in a cross-reference table that provides a one-to-one correspondence between known BIOS identification strings and the device make and model type associated with said known string.

13. The method of claim 12 wherein said scanned device configuration information is scanned from the digital device by executing a software program that scans the area of the BIOS memory containing the device configuration information.

14. The method of claim 10 wherein said BIOS version information includes a BIOS version revision identifier.

15. The method of claim 14 wherein said BIOS version revision identifier includes at least one of said BIOS revision number element and said BIOS revision date element.

16. The method of claim 10 wherein said BIOS version information includes at least said BIOS revision number element and said BIOS revision date element.

17. The method of claim 10 wherein said scanned device configuration information includes a model element and a submodel element.

18. The method of claim 10 wherein said computer system comprises a personal computer.

19. The method of claim 18, further comprising the step of:

inventorying a group of computers connected to a computer network using a BIOS identification string including at least said BIOS version information to identify the exact type of each personal computer being inventoried.

* * * * *